A. M. DUDLEY.
INDUCTION MOTOR.
APPLICATION FILED NOV. 8, 1911.

1,170,618.

Patented Feb. 8, 1916.
3 SHEETS—SHEET 1.

A. M. DUDLEY.
INDUCTION MOTOR.
APPLICATION FILED NOV. 8, 1911.
1,170,618.
Patented Feb. 8, 1916.
3 SHEETS—SHEET 2.
Fig. 3.
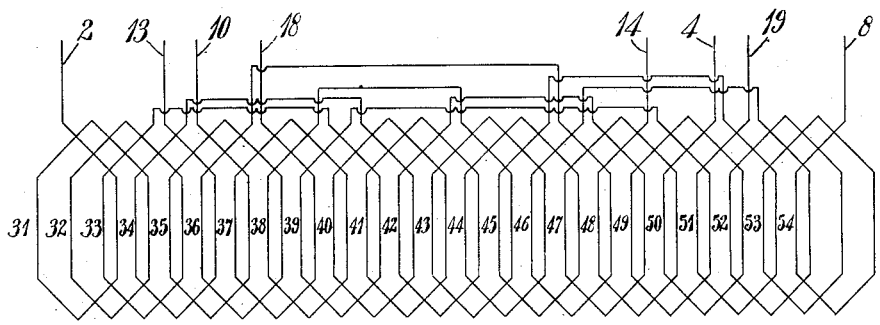
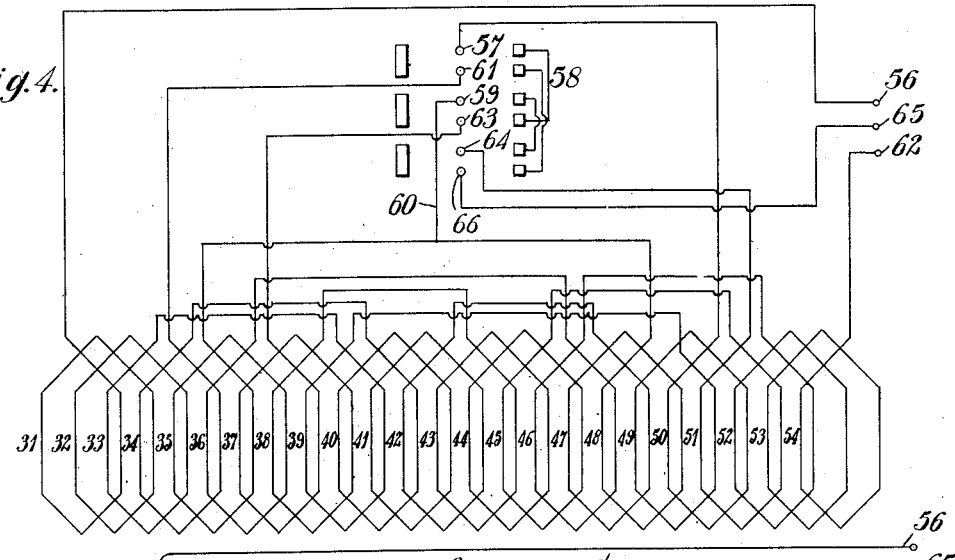
Fig. 4.
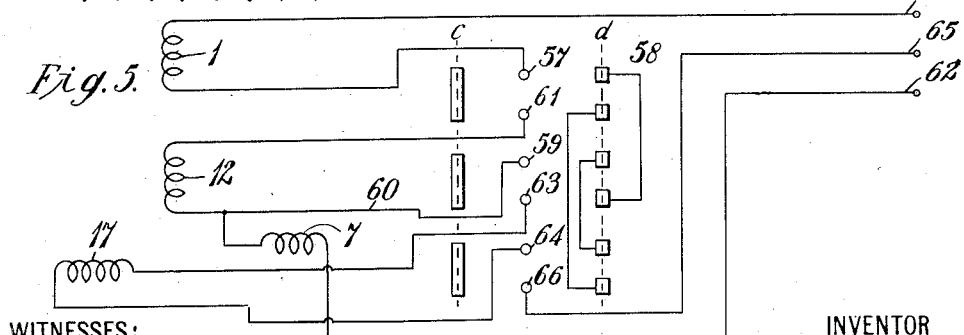
Fig. 5.
WITNESSES:
Fred H Miller
INVENTOR
Adolphus M. Dudley
BY
ATTORNEY

A. M. DUDLEY.
INDUCTION MOTOR.
APPLICATION FILED NOV. 8, 1911.

1,170,618.

Patented Feb. 8, 1916.
3 SHEETS—SHEET 3.

WITNESSES:
Fred A. Lind.
D. C. Davis.

INVENTOR
Adolphus M. Dudley
BY
Wesley G. Carr
ATTORNEY

UNITED STATES PATENT OFFICE.

ADOLPHUS M. DUDLEY, OF SWISSVALE, PENNSYLVANIA, ASSIGNOR TO WESTINGHOUSE ELECTRIC AND MANUFACTURING COMPANY, A CORPORATION OF PENNSYLVANIA.

INDUCTION-MOTOR.

1,170,618.  Specification of Letters Patent.  Patented Feb. 8, 1916.

Application filed November 8, 1911. Serial No. 659,150.

*To all whom it may concern:*

Be it known that I, ADOLPHUS M. DUDLEY, a citizen of the United States, and a resident of Swissvale, in the county of Allegheny and State of Pennsylvania, have invented a new and useful Improvement in Induction-Motors, of which the following is a specification.

My invention relates to alternating current motors and has special reference to such motors as are adapted for multispeed operation and are known as adjustable speed motors.

The object of my invention is to provide a motor of the class above indicated and a winding therefor that shall comprise a plurality of similar coils and shall embody a minimum number of external circuit leads, and particularly simple controlling means for adjusting the motor speeds.

My invention belongs to the same class as the inventions set forth in Alexanderson Patents Nos. 841,609 and 841,610, granted January 15, 1907, and is an improvement upon the subject matter of these patents.

In a more limited aspect, my invention consists in providing a polyphase winding for alternating current multi-speed motors having each phase or branch of the winding formed of uniform overlapping coils connected in two groups; the one comprising those coils which remain in the same phase or branch for more than one motor speed, and the other comprising those coils which change from one phase or branch to another in changing from one motor speed to another, suitable means being provided for effecting the necessary changes in the group connections.

It will be clearly understood by those skilled in the art that it is highly desirable to reduce the number of external leads with which the winding is necessarily provided, in order to simplify the speed-controlling mechanism and the motor connections. By the use of my present invention, I reduce the number of groups into which the winding is necessarily divided, from a minimum of four per phase or branch to a minimum of two per phase or branch. By reason of its simplicity, the winding is adapted for a very much wider application than windings of the same general class heretofore developed.

Figure 1:
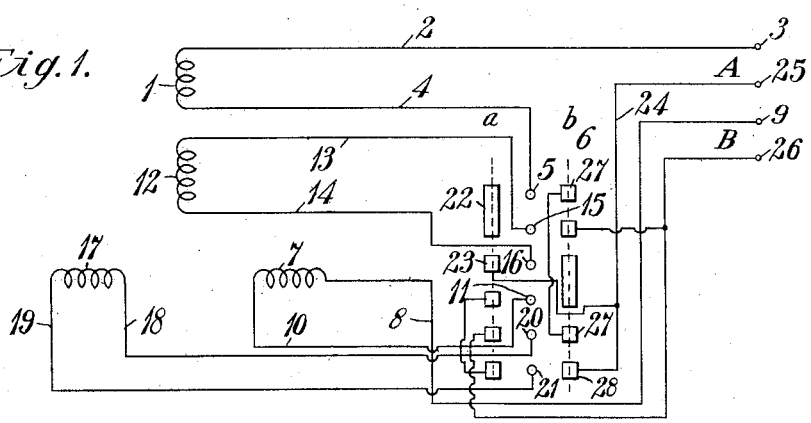
Figure 2:
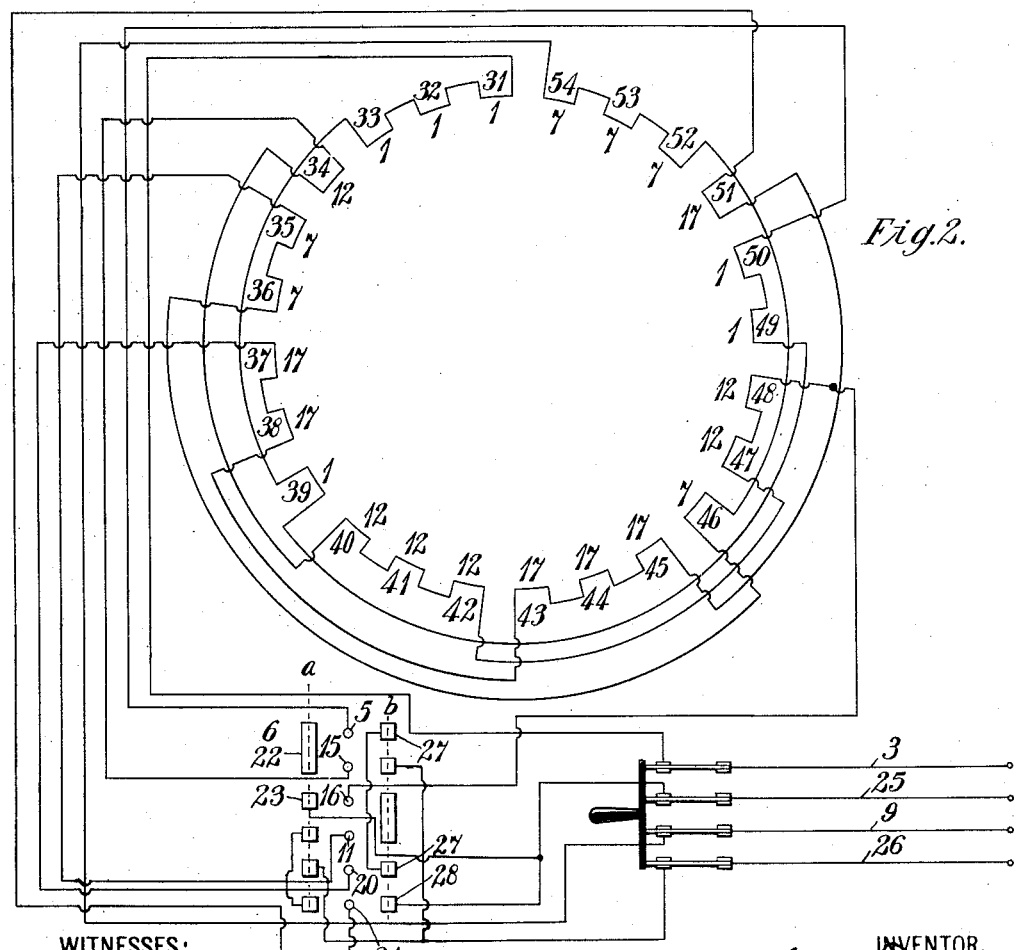
Figure 6:
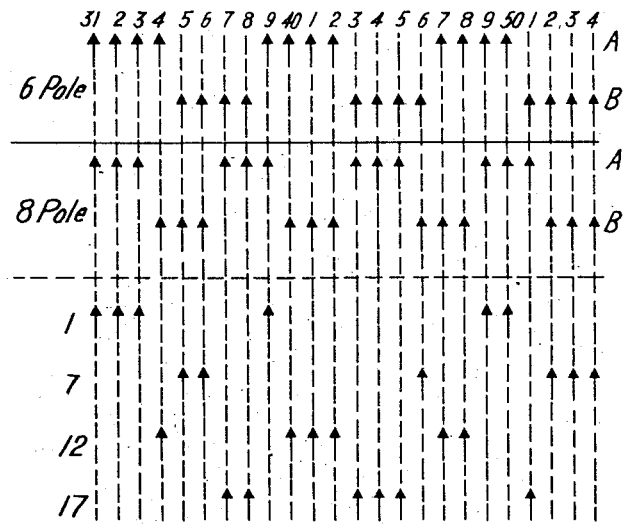
Figure 7:
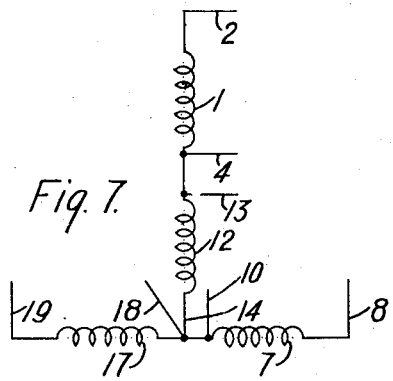
Figure 8:
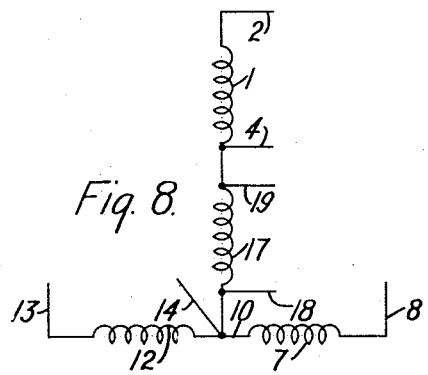

Figure 1 of the accompanying drawing is a diagrammatic view of a two-phase winding arranged in accordance with my invention, particularly illustrating the arrangement of groups. Fig. 2 is a diagrammatic view illustrating the distribution of coils. Fig. 3 shows the motor winding of my invention developed into a single plane. Figs. 4 and 5 are views corresponding, respectively, to Figs. 3 and 1 of a three-phase T-connected winding embodying my invention. Fig. 6 is a diagrammatic view illustrating the directions of the current traversing the several coils at the same instant. Figs. 7 and 8 are diagrammatic views illustrating the connections of the motor winding as established by the controlling switch of Figs. 4 and 5.

Assuming that a two-speed winding as shown in the drawings, to which reference may now be had, is produced, a single coil of the winding will clearly fall into one of four classes, as follows: 1. Coils in phase A for both speeds. 2. Coils in phase B for both speeds. 3. Coils changing from phase A to phase B in changing from one speed to the other. 4. Coils changing from phase B to phase A in changing from one speed to the other. The coils in each group are then permanently connected, the eight terminals being brought out to a suitable controller for changing the speed. In fact, when the winding is T-connected, as indicated in Fig. 4, it is possible to make one of the connections between groups permanent and, consequently, only seven leads are brought out when the motor is adapted to operate on a three-phase circuit.

In Fig. 1, coil group 1 is always connected to phase or branch A, one of its terminals being permanently connected by conductor 2 to supply-circuit terminal 3 and the opposite terminal being connected, through conductor 4, to contact finger 5 of a controller 6. Coil group 7 is always connected to phase or branch B, one of its terminals being permanently connected,—through conductor 8, to supply circuit terminal 9, and its opposite terminal being connected, through conductor 10, to control finger 11. Coil groups 12 changes from phase or branch A to phase or branch B, its terminals being respectively connected, through conductors 13 and 14, to contact fingers 15 and 16. Coil group 17 changes from phase or branch B to phase or branch A, its terminals being respectively connected, through conductors 18 and 19, to contact fingers 20 and 21.

The controller 6 is adapted to occupy an intermediate "off" position, as shown, and two closed circuit positions $a$ and $b$. When the controller occupies position $a$, a circuit is completed from terminal 3 of phase A through conductor 2, coil group 1, conductor 4, contact fingers 5 and 15 (which are bridged by contact member 22) conductor 13, coil group 12, conductor 14, contact finger 16, contact member 23 and conductor 24, to opposite line terminal 25. A circuit is similarly completed from terminal 9 of phase B through coil groups 7 and 17 to the opposite terminal 26.

When the controller occupies position $b$, a circuit is completed from terminal 3 of phase A through conductor 2, coil group 1, conductor 4, contact fingers 5 and 20 (which are bridged by a contact member 27) conductor 18, coil group 17, conductor 19, contact finger 21, contact member 28 and conductor 24, to opposite line terminal 25. A circuit is similarly completed from terminal 9 of phase B through coil groups 7 and 12. Thus it appears that, for one motor speed, coil groups 1 and 12 are connected in one phase or branch of the winding, and coil groups 7 and 17 in the other, while, for the other motor-speed, coil groups 1 and 17 constitute one phase or branch of the winding and coil groups 7 and 12 the other.

Referring to Fig. 2, the coil groups are divided into individual coils distributed as they would appear in the primary of an induction motor. It will be observed that the coils are so arranged and connected as to produce poles of only one polarity, the poles of opposite polarity resulting naturally or consequently between the poles for which the coils are wound. Twenty-four coils are shown and are numbered, consecutively, from 31 to 54. Coils 31, 32, 33, 39, 49 and 50 constitute group 1, coils 34, 40, 41, 42, 47 and 48 constitute group 12, coils 35, 36, 46, 52, 53 and 54 constitute group 7, and coils 37, 38, 43, 44, 45 and 51 constitute group 17. It will be observed that each of the groups comprise the same number of coils and also that the coils are symmetrically arranged.

Fig. 3 indicates the simplicity with which the connection between coils and between groups may be effected in a distributed winding.

In Figs. 4 and 5 the connections and control device are arranged for connecting the winding to a three-phase source of supply, a T-connected arrangement of the coil groups being maintained so that there are only two branches, as in the two-phase system, the coil groups being determined similarly according as the coils remain in one branch of the winding or the other, or are changing from one branch to the other, as the motor-speed is adjusted.

Referring to these figures in which the coils and the coil groups are designated by the same reference characters as in Figs. 1, 2 and 3, one terminal of coil group 1 is connected to terminal 56 of a three-phase circuit, the opposite terminal of the group being connected to contact finger 57 of a speed controlling switch 58. The adjacent terminals of coil groups 7 and 12 are permanently interconnected and are connected to a contact finger 59 through conductor 60. The free terminal of group 12 is connected to contact finger 61, and the free terminal of group 7 is connected to line terminal 62. The terminals of group 17 are respectively connected to contact fingers 63 and 64. The remaining line terminal 65 is connected to contact finger 66.

The speed-controlling switch 58 is adapted to occupy positions $c$ and $d$, and, when in position $c$, the coil groups are connected as follows: Groups 1 and 12 constitute one branch of the T-connected winding, circuit being completed from line terminal 56 through group 1, fingers 57 and 61, and groups 12 to the point of connection between groups 7 and 12. Circuit is completed from line terminal 65 through contact fingers 66 and 64, group 17, fingers 63 and 59, and conductor 60 to the same point of connection. A third circuit is completed from circuit terminal 62 through group 7 to the same point of connection.

In Fig. 6 is shown a simplified diagram of the character employed for determining the coil connections in a circuit such as that shown in Fig. 2 which is arranged to provide either six poles or eight poles. Each coil from 31 to 54, inclusive, is represented by an arrow, indicating by its position the center line of the coil and by its direction the direction of current flow, at a given instant, in one side of the coil, the particular side chosen being the same in all cases. For six-pole operation, the twenty four coils are divided into six groups of four each, as indicated in the upper portion of Fig. 6, and said groups are further arranged in two rows marked respectively "A" and "B" and corresponding respectively to the A and B phases in Fig. 1. In like manner, for eight-pole operation, the twenty-four coils are divided into eight groups, of three coils each, and these groups are also arranged in equal A and B phases.

From an inspection of the six-pole and eight-pole groupings, it will be noted that coils 31, 32, 33, 39, 49 and 50 are in the A phase in each case and these coils may therefore be connected together to form winding 1 in Fig. 2. In like manner, coils 35, 36, 46, 52, 53 and 54 are in the B phase in each pole grouping and these coils may accordingly be connected together to form the winding 7 in Fig. 2. The coils 34, 40, 41 42, 47 and 48 change from the A phase to the B phase in the transition from the six pole to the eight pole connection and are accordingly connected together to form the winding 12. The remaining coils change from the B phase to the A phase and accordingly form the winding 17.

It will be noted from Fig. 6 that the direction of current flow in all the coils is the same at each instant, because of applicant's use of consequent poles, all wound poles having the same polarity at the same instant. The relative direction of current flow is not reversed in any of the groups of coils in changing from one speed to the other.

Figs. 7 and 8 illustrate, respectively, the connections of the several coil groups for the production of six poles and eight poles. Since the coil groups 7 and 12 are permanently connected, a minimum of seven conductors may be employed. It will be noted that the groups 12 and 17 are changed from one branch to another without relatively reversing their respective terminal connections and therefore without reversing the relative direction of current-flow in the coil groups 12 and 17.

I am aware of the fact that, by causing the two phases A and B to have like numbers of coils, a slightly distorted T connection is provided with consequent slight unbalancing but, for many classes of service, this effect may be neglected.

It is evident that the total number of coils in the winding and in the several groups will be determined by the service for which the motor is intended, and that other variations may be effected within the spirit and scope of my invention.

I claim as my invention:

1. A winding for polyphase multi-speed alternating current motors consisting of conductors so arranged that the current always flows in the same relative direction, and means for connecting said conductors to form a plurality of groups according as they belong to a single branch for all speeds, or are changing from one branch to another.

2. A winding for polyphase multi-speed alternating current motors consisting of coils so arranged that the current always flows in the same relative direction, and means for connecting said coils to form a plurality of groups which, respectively, contain coils which remain in one phase for all speeds and those which change phase in passing from one speed to the other.

3. A winding for polyphase multi-speed alternating current motors consisting of coils in all of which the current continuously flows in the same relative direction to produce a plurality of consequent poles, said coils being permanently connected in groups according as they belong to one phase for all speeds, or change from one phase to another when the motor speed is changed.

4. In a two-speed consequent-pole induction motor, the combination with a winding composed of coils arranged in groups and having said groups arranged in relatively displaced phases, of means for interchanging certain of said groups between said phases and for maintaining the relative direction of current flow in said coils.

5. A multi-speed winding for alternating current motors, arranged in T connection and comprising a plurality of uniformly distributed coils in two branches of two groups each, and means for changing the connections of said groups without changing the relative direction of current in said groups.

6. A multi-speed winding for alternating current motors, arranged in T connection, a plurality of uniformly distributed coils connected in two branches of two groups each, two of said groups being permanently connected together, and means for changing the connections of said groups except at said permanent connection for varying the speed of the motor without changing the relative direction of current in said groups, whereby a maximum of eight winding terminals is required.

7. A multi-speed winding for alternating current motors, arranged in T connection and consisting of two branches of two groups each, and means for changing the connections of said groups without changing the relative direction of current therein.

8. A multi-speed winding for alternating current motors arranged in T connection and comprising a plurality of uniform, distributed coils divided into two branches of two groups each, the coils of each group being permanently connected, whereby a maximum of eight winding terminals is required.

9. A winding for polyphase multi-speed alternating current motors consisting of a plurality of conductors, means for connecting said conductors to form a plurality of groups according as they belong to a single branch for all speeds or are changed from one branch to another and for maintaining the relative direction of current-flow in said conductors.

10. A multi-speed winding for alternating current motors, consisting of a plurality of uniform distributed coils arranged to produce poles of like sign, said coils being divided into two branches of two groups each, the coils of each group being permanently connected and distributed in unequal sub-groups whereby a maximum of eight terminals is required.

11. A multi-speed winding for alternating current motors, comprising a plurality of uniform distributed coils divided into two branches of two groups each, the coils being permanently connected and distributed in unequal sub-groups, each of said groups being divided into similar sub-groups.

12. A winding for polyphase multi-speed alternating current motors consisting of a plurality of groups of conductors, a part of said groups remaining in a single branch for all speeds, and the remainder of said groups being changed from one branch to another, and means for changing said last-named groups from one branch to another and for maintaining the relative direction of current flow in said groups.

13. A multi-speed winding for alternating current motors, arranged in T connection, a plurality of uniformly distributed coils connected in two branches of two groups each, two of said groups being permanently connected together and means for changing the connections of said groups except at said permanent connection for varying the speed of the motor without changing the relative direction of current in said groups, whereby only seven winding terminals are required.

In testimony whereof, I have hereunto subscribed my name this 31st day of Oct., 1911.

ADOLPHUS M. DUDLEY.

Witnesses:
M. W. BARTMESS,
B. B. HINES.